United States Patent
Hung (10) Patent No.: US 12,255,560 B2
(45) Date of Patent: Mar. 18, 2025

(54) MOTOR CONTROL DEVICE AND MOTOR CONTROL METHOD

(71) Applicant: Nuvoton Technology Corporation, Hsinchu (TW)

(72) Inventor: Chia-Hung Hung, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 173 days.

(21) Appl. No.: 17/991,821

(22) Filed: Nov. 21, 2022

(65) Prior Publication Data

US 2023/0208331 A1    Jun. 29, 2023

(30) Foreign Application Priority Data

Dec. 29, 2021   (TW) ................. 110149361

(51) Int. Cl.
*H02P 6/00* (2016.01)
*H02P 6/08* (2016.01)
*H02P 6/20* (2016.01)
*H02P 6/28* (2016.01)
*H02P 21/32* (2016.01)
*H02P 21/34* (2016.01)

(52) U.S. Cl.
CPC ............. *H02P 21/32* (2016.02); *H02P 6/08* (2013.01); *H02P 6/20* (2013.01); *H02P 6/28* (2016.02); *H02P 21/34* (2016.02)

(58) Field of Classification Search
CPC .. H02P 21/32; H02P 6/28; H02P 21/34; H02P 6/08; H02P 6/20; H02P 21/22
See application file for complete search history.

(56) References Cited

U.S. PATENT DOCUMENTS

| 8,203,295 B2 | 6/2012 | Ting et al. |
| 2011/0241658 A1 | 10/2011 | Vollmer |
| 2020/0395876 A1 | 12/2020 | Greiner |

FOREIGN PATENT DOCUMENTS

| TW | I259647 | 8/2006 | |
| TW | I672901 | 9/2019 | |
| WO | 2019072327 | 4/2019 | |
| WO | WO-2019205112 A1 * | 10/2019 | ............. H02P 21/05 |

* cited by examiner

*Primary Examiner* — Karen Masih
(74) *Attorney, Agent, or Firm* — JCIPRNET (57) ABSTRACT

A motor control device and a motor control method are provided. The motor control device includes a memory and a controller. During an initialization period, the controller drives a brushless DC motor to change a rotor position through a drive circuit for adjusting and obtaining a starting angle and a locked exciting current corresponding to the starting angle, and the controller stores starting-angle information corresponding to the starting angle and locked exciting-current information corresponding to the locked exciting current in the memory. After the initialization period ends, during a normal rotation period, the controller maintains the rotor position of the brushless DC motor at the starting angle with the locked exciting current through the drive circuit, until the controller activates the brushless DC motor through the drive circuit.

10 Claims, 6 Drawing Sheets

MOTOR CONTROL DEVICE AND MOTOR CONTROL METHOD

CROSS-REFERENCE TO RELATED APPLICATION

This application claims the priority benefit of Taiwan application serial no. 110149361, filed on Dec. 29, 2021. The entirety of the above-mentioned patent application is hereby incorporated by reference herein and made a part of this specification.

BACKGROUND

Technical Field

The present disclosure relates to a motor device, particularly to a motor control device and a motor control method.

Description of Related Art

A brushless DC motor includes a drive circuit and a controller. The brushless DC motor does not have carbon brushes and commutators, which solves the problems of short service life, electrical noise, and mechanical noise caused by the friction between the carbon brushes and the commutators. This type of motor usually has a flat permanent magnet as the rotor. To start the motor without the knowledge of the starting position of the rotor, the conventional technique is to select arbitrarily one phase from the three-phase ports (that is, U-phase port, V-phase port, and W-phase port) of the motor, and input the pulse wave into the selected port to pull the motor rotor from its current position to the specified position. It takes a considerable amount of time to pull the motor rotor from a random position to a specified position every time the motor is activated, and excessive time spent on activation preparation may not meet the design requirements. Furthermore, pulling the rotor from a random position to a specified position may cause the motor and the fan to vibrate, which makes noises. In some rare cases, the rotor cannot be driven at from its current position because the angle between the stator magnetic field direction and the rotor magnetic field direction happens to be 180°.

SUMMARY

The present disclosure provides a motor control device and a motor control method for controlling the operation of a motor.

In an embodiment of the disclosure, the motor control device includes a memory and a controller. The memory stores at least one control parameter. The at least one control parameter includes starting-angle information and locked exciting-current information. The controller is coupled to the memory to access the at least one control parameter. During an initialization period, the controller drives a motor to change a rotor position through a drive circuit for adjusting and obtaining a starting angle and a locked exciting current corresponding to the starting angle, and the controller stores the starting-angle information corresponding to the starting angle and the locked exciting-current information corresponding to the locked exciting current in the memory. After the initialization period ends, during a normal rotation period, the controller maintains the rotor position of the motor at the starting angle with the locked exciting current through the drive circuit until the controller activates the motor through the drive circuit.

In an embodiment of the disclosure, the motor control method includes: during an initialization period, a motor is driven to change a rotor position for adjusting and obtaining a starting angle and a locked exciting current corresponding to the starting angle, and the starting-angle information corresponding to the starting angle and the locked exciting-current information corresponding to the locked exciting current are stored in the memory; and after the initialization period ends, during a normal rotation period, the rotor position of the motor is maintained at the starting angle with the locked exciting current until the motor is activated.

Based on the above, according to the embodiments of the disclosure, the controllers can adjust and obtain the starting angle of the rotor and the locked exciting current during an initialization period. After each run of the motor, the controller maintains the motor rotor at a known position (that is, the starting angle) with the locked exciting current, so that when the motor is activated the next time, the controller can accurately calculate the proper driving voltage, drive current, and driving direction based on the rotor position already known.

In order to make the features and advantages of the disclosure more comprehensible, the following embodiments are described in detail with the drawings attached.

DESCRIPTION OF THE EMBODIMENTS

The term "coupled" (or "connected") throughout this specification (including the claims of the application) refers to any direct or indirect means of connection. For example, if the text describes that a first device is coupled (or connected) to a second device, it should be interpreted that the first device is directly connected to the second device, or that the first device is indirectly connected to the second device through other devices or some connecting process. Terms such as "first" and "second" in the full text of the description of this application (including the claims of the patent application) are used to designate the names of elements, or to distinguish different embodiments or scopes, rather than to limit the upper or lower limit of the number of elements; nor is it intended to limit the order of the elements. Also, where possible, elements/components/steps with the same reference numerals in the drawings and embodiments represent the same or similar parts. Elements/components/ steps that use the same reference numerals or use the same terminology in different embodiments may refer to relative descriptions of each other.

Figure 1:
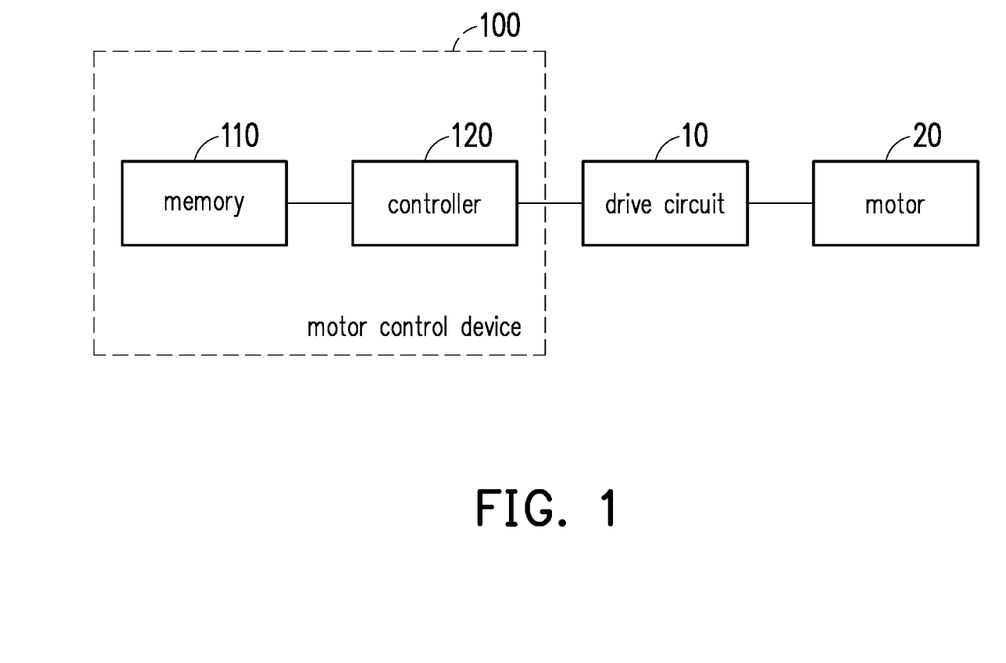
FIG. 1 is a schematic diagram of a circuit block of a motor control device according to an embodiment of the disclosure.

FIG. 1 is a schematic diagram of a circuit block of a motor control device 100 according to an embodiment of the disclosure. The motor control device 100 in FIG. 1 controls a drive circuit 10 to drive a motor 20 through the drive circuit 10. The motor 20 may be a brushless DC motor or other types of motors, depending on the actual design. This embodiment does not limit the implementation details of the drive circuit 10. For example, the drive circuit 10 includes a conventional motor drive circuit or other drive circuits.

In the embodiment in FIG. 1, the motor control device 100 includes a memory 110 and a controller 120. The memory 110 stores at least one control parameter. The at least one control parameter may include starting-angle information and locked exciting-current information based on the actual design. The controller 120 is coupled to the memory 110 to access the control parameters. Depending on different design requirements, the implementation of the controller 120 may be hardware, firmware, software (that is, a program), or a combination thereof.

In terms of hardware, the controller 120 may be implemented as a logic circuit in an integrated circuit. The relevant functions of the controller 120 may be implemented in hardware using hardware description languages (for example, Verilog HDL or VHDL) or other suitable programming languages. For example, the related functions of the controller 120 is implemented in one or more controllers, microcontrollers, microprocessors, application-specific integrated circuits (ASICs), digital signal processors (DSP), Field Programmable Gate Array (FPGA), and/or logic blocks, modules, and circuits in other processing units.

In terms of software and/or firmware, the relevant functions of the controller 120 may be implemented as programming codes. For example, the controller 120 is implemented using general programming languages (for example, C, C++, or assembly languages) or other suitable programming languages. The programming code may be recorded/stored in a non-transitory computer readable medium. In some embodiments, the non-transitory computer-readable medium includes, for example, Read Only Memory (ROM), tape, disk, card, semiconductor memory, programmable logic circuits, and/or storage devices. The storage device includes a hard disk drive (HDD), a solid-state drive (SSD), and other storage devices. A computer, a central processing unit (CPU), a controller, a microcontroller, or a microprocessor can read and execute the programming code from the non-transitory computer-readable medium to implement related functions of the controller 120.

Figure 2:
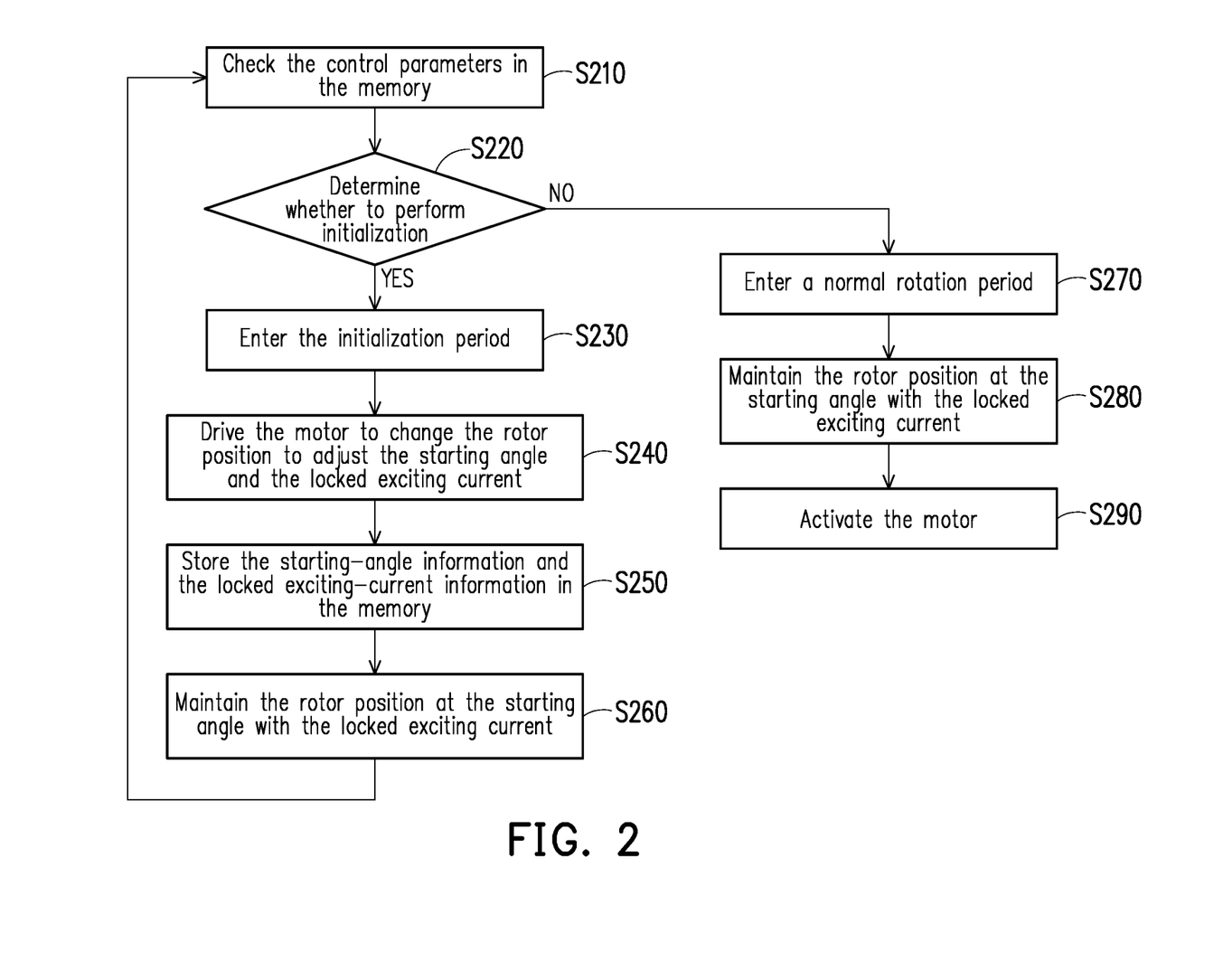
FIG. 2 is a schematic flowchart of a motor control method according to an embodiment of the disclosure.

FIG. 2 is a schematic flowchart of a motor control method according to an embodiment of the disclosure. Please refer to FIG. 1 and FIG. 2. In step S210, the controller 120 checks whether the control parameters in the memory 110 are ready, and/or determines whether the rotor position of the motor 20 is maintained at the starting angle. The starting angle is a known angle; the starting angle adjusted and obtained in step S240 is described later. When the rotor position is known, the controller 120 calculates the optimal driving direction and the optimal strength with any algorithm for the current rotor position.

In step S220, the controller 120 determines whether to perform an initialization period operation based on the check result of step S210. When the control parameters in the memory 110 are not ready (and the decision of step S220 is "Yes"), the controller 120 enters the initialization period (step S230). During an initialization period, the controller 120 performs various initialization period operations. For example, the controller 120 drives the motor 20 through the drive circuit 10 to change the rotor position, so as to adjust and obtain the starting angle and the standstill exciting current corresponding to the starting angle (step S240). In step S250, the controller 120 stores/updates the starting-angle information corresponding to the starting angle and the locked exciting-current information corresponding to the locked exciting current in the memory 110. After the initialization period operation is completed, the controller 120 maintains the rotor position of the motor 20 at a known position (that is, the starting angle) with the locked exciting current through the drive circuit 10 (step S260). After the initialization period ends, the controller 120 returns to step S210.

When the control parameters in the memory 110 are ready (and the decision of step S220 is "No"), the controller 120 ends the initialization period and enters a normal rotation period (step S270). During the normal rotation period, the controller 120 continues to maintain the rotor position of the motor 20 at the starting angle with the locked exciting current through the drive circuit 10 (step S280), until the controller 120 activates the motor 20 through the drive circuit 10 (step S290).

Based on the above, the controller 120 adjusts and obtains the starting angle of the rotor and the locked exciting current during the initialization period. After each run of the motor 20, the controller 120 maintains the motor rotor at a known position (that is, the starting angle) with the locked exciting current. When the motor 20 is activated the next time, the controller 120 can accurately calculate the proper driving voltage, drive current, and driving direction based on the rotor position already known. Therefore, problems related to activating the motor 20, such as motor vibration, fan vibration, noise, non-rotation of the rotor, and reverse rotation of the rotor, may be resolved effectively.

Depending on the actual design, the motor 20 may be an N-phase motor, where N is an integer. The controller 120 performs the 2N-step drive on the motor 20 through the drive circuit 10 in step S240 to adjust the minimum exciting current in respective steps of the 2N-step drive. For example, in any step of the 2N-step drive, the controller 120 reduces the drive current from the upper limit of current until a certain adjustment condition is satisfied. The controller 120 takes the drive current when the adjustment condition is satisfied as the minimum exciting current of any step of the 2N-step drive. The controller 120 selects one of the minimum exciting currents in 2N-step drive as the locked exciting current in step S240. The controller 120 adopts the composite vector angle corresponding to the locked exciting current as the starting angle.

Figure 3:
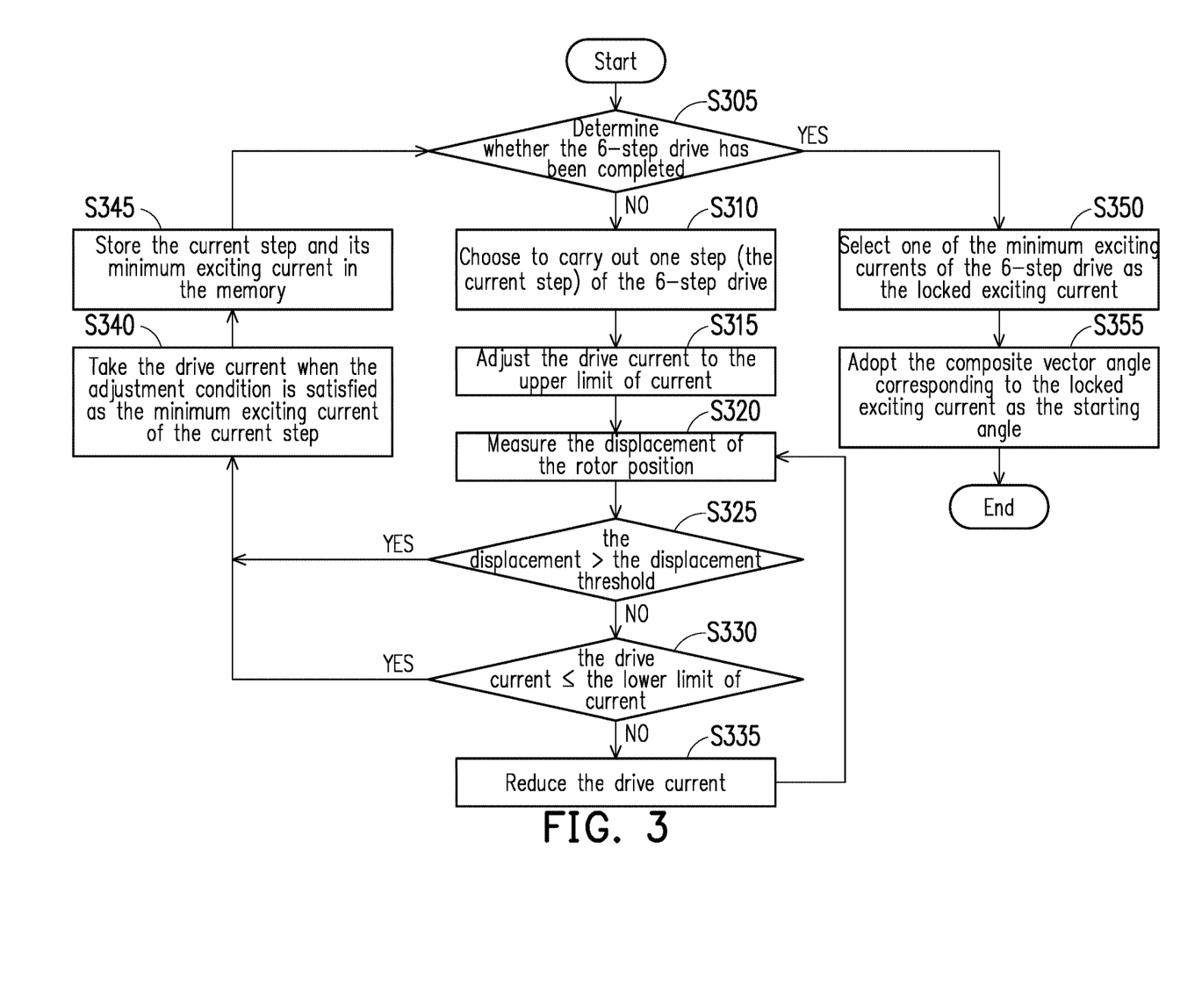
FIG. 3 is a schematic flowchart illustrating a method for adjusting the starting angle and the locked exciting current according to an embodiment of the disclosure.

FIG. 3 is a schematic flowchart illustrating a method for adjusting the starting angle and the locked exciting current according to an embodiment of the disclosure. In some implementation scenarios, please refer to the related description in FIG. 3 for the implementation details of step S240 in FIG. 2. In the embodiment in FIG. 3, the adjustment condition includes: "the displacement of the rotor position is greater than the displacement threshold (step S325) or the drive current of the motor is less than or equal to the lower limit of current (step S330)." In the embodiment in FIG. 3, the motor 20 is assumed to be a 3-phase motor. The controller 120 drives the motor 20 in 6 steps through the drive circuit 10 to adjust the minimum exciting current in respective steps of the 6-step drive. In step S305, the controller 120 determines whether the 6-step drive has been completed.

FIG. 4A to FIG. 4F are schematic diagrams illustrating the 6-step drive of a 3-phase motor according to an embodiment of the disclosure. The controller 120 drives the motor 20 in 6 steps in FIG. 4A to FIG. 4F through the drive circuit 10. The embodiment in FIG. 4A to FIG. 4F takes the counter clockwise rotation as an example of 6-step drive. In other embodiments, the specific implementation of the 6-step drive is not limited to the examples in FIG. 4A to FIG. 4F.

Figure 4A:
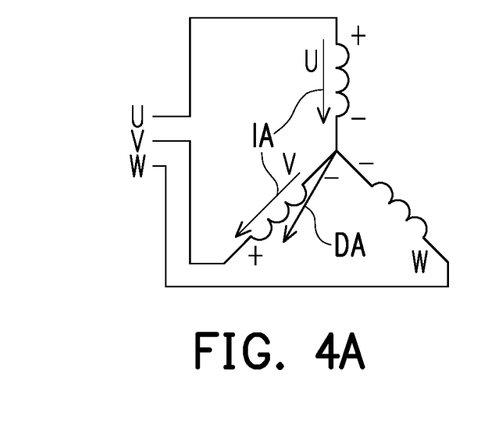
FIG. 4A to FIG. 4F are schematic diagrams illustrating a 6-step drive of a 3-phase motor according to an embodiment of the disclosure.
Figure 4B:
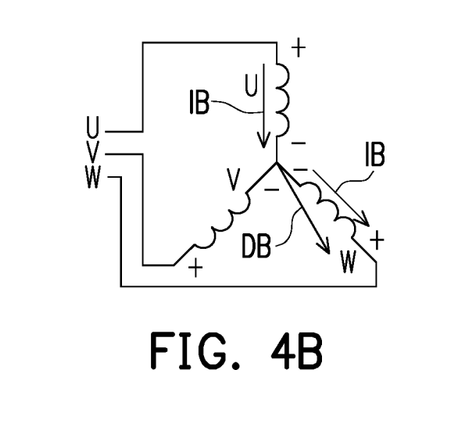
Figure 4C:
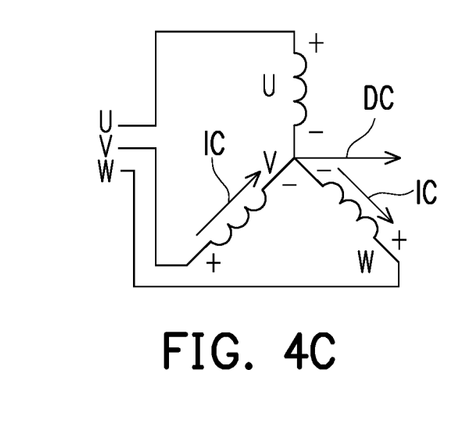
Figure 4D:
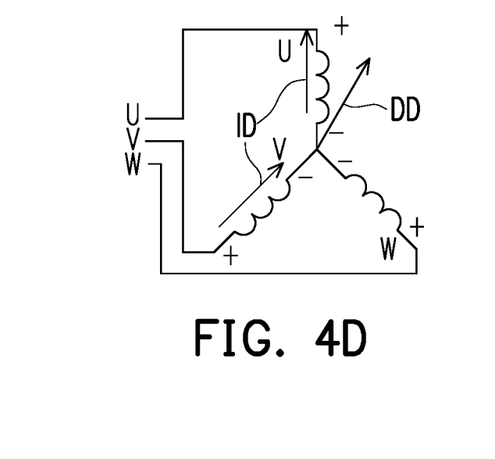
Figure 4E:
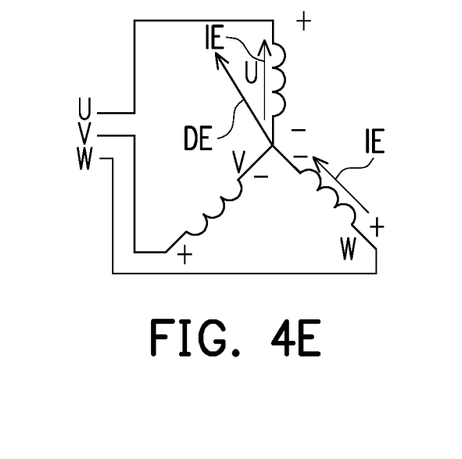
Figure 4F:
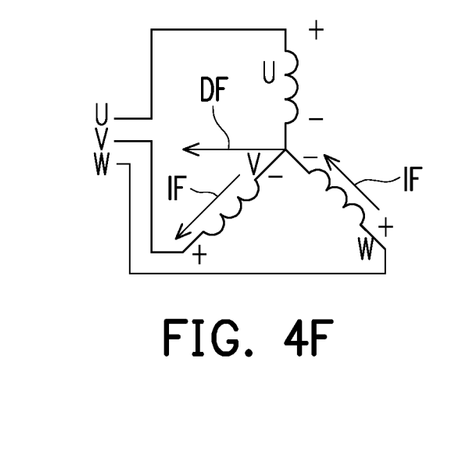

FIG. 4A shows the first step of the 6-step drive. In the operating scenario in FIG. 4A, based on the control of the controller 120, the drive circuit 10 provides a drive current IA to the U-phase port of the motor 20, and the drive current IA flows back to the drive circuit 10 sequentially through the U-phase coil, the V-phase coil, and the V-phase port. Based on the magnetic force of the U-phase coil and the V-phase coil, the rotor position (or the composite vector angle) is the rotor position DA in FIG. 4A. In the second step of the 6-step drive in FIG. 4B, a drive current IB provided by the drive circuit 10 enters the U-phase port and leaves from the W-phase port, so that the rotor position is the rotor position DB in FIG. 4B. In the third step of the 6-step drive in FIG. 4C, a drive current IC provided by the drive circuit 10 enters the V-phase port and leaves from the W-phase port, so that the rotor position is the rotor position DC in FIG. 4C. In the fourth step of the 6-step drive in FIG. 4D, a drive current ID provided by the drive circuit 10 enters the V-phase port and leaves from the U-phase port, so that the rotor position is the rotor position DD in FIG. 4D. In the fifth step of the 6-step drive in FIG. 4E, a drive current IE provided by the drive circuit 10 enters the W-phase port and leaves from the U-phase port, so that the rotor position is the rotor position DE in FIG. 4E. In the sixth step of the 6-step drive in FIG. 4F, a drive current IF provided by the drive circuit 10 enters the W-phase port and leaves from the V-phase port, so that the rotor position is the rotor position DF in FIG. 4F.

Please refer to FIG. 1 and FIG. 3. When the 6-step drive has not been completed (and the determination result in step S305 is "No"), the controller 120 proceeds to step S310 and chooses to carry out one step (the current step) of the 6-step drive. In step S315, the controller 120 adjusts the drive current of the current step to the upper limit of current. The upper limit of current may be defined based on the actual design. For example, in step S310, the first step (the current step) of the 6-step drive in FIG. 4A is chosen to be carried out, and in step S315, the drive current IA shown in FIG. 4A is adjusted to the upper limit of current.

In step S320, the displacement of the rotor position is measured. In step S325, the controller 120 determines whether the displacement of the rotor position is greater than the displacement threshold. The displacement threshold may be defined based on the actual design. For example, the displacement threshold is 1°. When the displacement of the rotor position is not greater than the displacement threshold (and the determination result in step S325 is "No"), the controller 120 performs step S330 to determine whether the drive current of the motor 20 is less than or equal to the lower limit of current. Take FIG. 4A as an example. In step S330, it is determined whether the drive current IA of the motor 20 is less than or equal to the lower limit of current. The lower limit of current may be defined based on the actual design. When the drive current of the motor 20 is greater than the lower limit of current (and the determination result in step S330 is "No"), the controller 120 performs step S335 to reduce the drive current of the motor 20 by one current step. The current steps may be defined based on the actual design. After completing step S335, the controller 120 returns to step S320.

When the displacement of the rotor position is greater than the displacement threshold (and the determination result in step S325 is "Yes"), or when the drive current of the motor 20 is less than or equal to the lower limit of current (and the determination result in step S330 is "Yes"), the controller 120 takes the drive current when the adjustment condition (steps S325 and S330) is satisfied as the minimum exciting current of the current step in step S340. In step S345, the controller 120 stores the current step and its minimum exciting current in the memory 110. After completing step S345, the controller 120 returns to step S305. For example, after the controller 120 obtains the minimum exciting current of the first step by completing steps S315 to S345 for the first step of the 6-step drive in FIG. 4A, the controller 120 chooses to carry out the second step of the 6-step drive in FIG. 4B in step S310, and obtains the minimum exciting current of the second step by completing steps S315 to S345 for the second step of the 6-step drive in FIG. 4B. Similarly, the controller 120 obtains the minimum exciting current of the third step in FIG. 4C, the minimum exciting current of the fourth step in FIG. 4D, the minimum exciting current of the fifth step in FIG. 4E, and the minimum exciting current of the sixth step in FIG. 4F.

When the 6-step drive is fully completed (and the determination result of step S305 is "Yes"), the controller 120 proceeds to step S350 to select one of the minimum exciting currents of the 6-step drive as the locked exciting current. For example, the controller 120 selects the smallest one from the six minimum exciting currents of the 6-step drive as the locked exciting current. In step S355, the controller 120 adopts the composite vector angle corresponding to the locked exciting current (that is, the selected minimum exciting current) as the starting angle.

Therefore, after completing the 6-step drive, the controller 120 finds the minimum current value from the 6-step drive exciting current and adopts it as the optimal locked exciting current. In addition, the controller 120 may set the direction corresponding to the optimal locked exciting current as the optimal starting angle. After completing the process in FIG. 3, the controller 120 performs step S260 and step S280 in FIG. 2 to keep the motor 20 in the excitation state.

Figure 5:
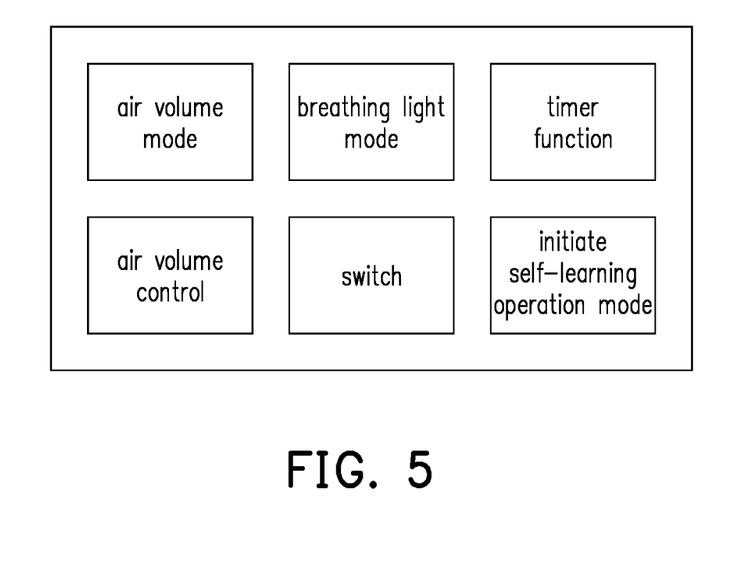
FIG. 5 is a schematic diagram illustrating a human-machine interface according to an embodiment of the disclosure.

FIG. 5 is a schematic diagram illustrating a human-machine interface according to an embodiment of the disclosure. The human-machine interface (that is, the user operation interface) in FIG. 5 includes a number of touch buttons, such as "air volume mode," "breathing light mode," "timer function," "air volume control," "switch," and "initiate self-learning operation mode." The human-machine interface in FIG. 5 transmits the user's operation instructions to the controller 120.

Figure 6:
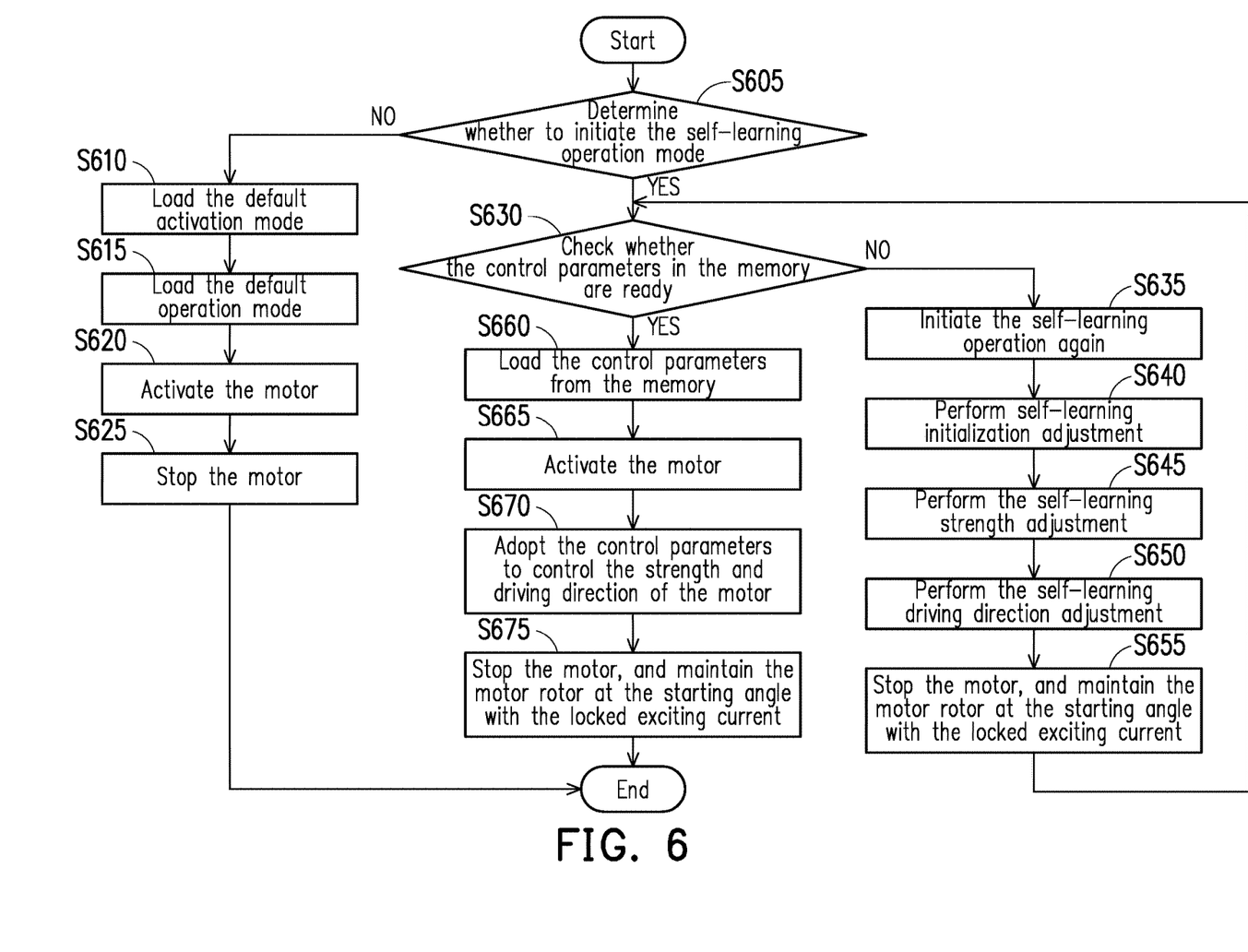
FIG. 6 is a schematic flowchart of a motor control method according to another embodiment of the disclosure.

FIG. 6 is a schematic flowchart of a motor control method according to another embodiment of the disclosure. Please refer to FIG. 1 and FIG. 6. In step S605, a controller 120 determines whether to initiate the self-learning operation mode. For example, the controller 120 determines whether the touch button "starting the self-learning operation mode" in FIG. 5 is pressed to further determine whether to initiate the self-learning operation mode. When the controller 120 determines not to initiate the self-learning operation mode (and the determination result in step S605 is "No"), the controller 120 performs step S610 to load the default activation mode. In step S615, the controller 120 loads a default operation mode. After loading the default activation mode and the default operation mode, the controller 120 activates the motor 20 through the drive circuit 10 (step S620). Depending on the actual design, steps S610 to S620 may be conventional motor control methods or other control methods. Based on the automatic operation function or the user's operation instruction, the controller 120 stops the rotation of the motor 20 through the drive circuit 10 (step S625).

When the controller 120 determines that the self-learning operation mode is initiated (and the determination result in step S605 is "Yes"), the controller 120 performs step S630 to check whether the control parameters in the memory 110 are ready and determines whether to perform the initialization period operation based on the check result (steps S635 to S650) and check whether the rotor position is at the optimal starting angle. When the control parameters in the memory 110 are not ready, or when the rotor position is not at the starting angle (and the decision of step S630 is "No"), the controller 120 is in the initialization period and once again initiates the self-learning operation (step S635). During the initialization period, the controller 120 performs various self-learning initialization period operations. For example, the controller 120 performs self-learning initialization adjustment (step S640), self-learning strength adjustment (step S645), and self-learning driving direction adjustment (step S650).

In step S640, the controller 120 drives the motor 20 to change the rotor position through the drive circuit 10, so as to adjust and obtain the starting angle and the locked exciting current corresponding to the starting angle. Please refer to the related descriptions of step S240 in FIG. 2 and/or that of steps S305 to S355 in FIG. 3 for the implementation details of step S640 in FIG. 6, as the same description is not be repeated herein. The controller 120 stores/updates the starting-angle information corresponding to the starting angle and the locked exciting-current information corresponding to the locked exciting current as control parameters in the memory 110.

In step S645, the controller 120 performs the self-learning strength adjustment. The motor torque formula is $$T_e = T_L + J\, d\omega/dt + B\omega,$$

in which $T_e$ represents the motor output torque (i.e., the torque needed to maintain the motor 20 at a specific angular velocity), $T_L$ represents the load torque, J represents the rotational inertia of the rotor, B represents the frictional resistance, and $\omega$ represents the angular velocity. It may be seen from the motor torque formula that due to the relationship between $$d\omega/dt$$

and B, the drive current required during the acceleration or deceleration is larger while the required drive current is relatively small when the angular velocity is stable. In step S645, the controller 120 drives the motor 20 with a certain drive current through the drive circuit 10, so that the rotating speed of the motor 20 is maintained at the target rotating speed. For example, the controller 120 drives the motor 20 at the maximum drive current (i.e., the rated maximum current) through the drive circuit 10 until the rotating speed of the motor 20 accelerates to the target rotating speed. The target rotating speed may be determined according to product specifications (for example, it is a wind speed level of a cooling fan). For example, the target rotating speed is 900 rpm, or other rotating speeds. The phase angle of the drive current affects the current value of the drive current for maintaining the target rotating speed. Generally, the current value of the drive current for maintaining the target rotating speed is the lowest at the optimum phase. The controller 120 calculates the optimal phase with an algorithm to maintain the drive current at the target rotating speed. After calculating the optimal phase, the controller 120 stores the corresponding minimum current driving force in the memory 110. In other words, the controller 120 stores the optimal phase corresponding to the target rotating speed in the memory 110 as a control parameter.

The paragraph above is to calculate the optimal phase for a certain target rotating speed. When the product specification has multiple target rotating speeds (for example, the cooling fan has multiple wind speed levels), the controller 120 may change the rotating speed of the motor 20 to different target rotating speeds (that is, different wind speed levels) in a same way described in the above paragraphs, and the self-learning strength adjustment for different target rotating speeds may be completed by repeating the operation content of the above paragraphs. After the initialization period ends and the normal rotation period of the self-learning operation mode starts, when the rotating speed mode of the motor 20 is set to the target rotating speed, the controller 120 obtains from the memory 110 the optimal phase corresponding to the target rotating speed (for example, in step S660), and the controller 120 drives and controls the motor 20 with the optimal phase through the drive circuit 10 (for example, in step S670).

In step S650, the controller 120 performs the self-learning driving direction adjustment. One complete rotation (for example, a 360° rotation) of the motor 20 includes multiple reference positions. The number of the reference positions may be determined based on the actual design. For example, in some embodiments, a complete rotation of the motor 20 is divided into 360 equal parts. In other words, every 1° is a reference position (a self-learning cycle is performed every 1° for the driving direction). In other embodiments, a complete rotation of the motor 20 is divided into 12 equal parts. In other words, every 30° is a reference position (a self-learning cycle is performed every 30° for the driving direction). In still other embodiments, a complete rotation of the motor 20 is divided into 3 equal parts. In other words, every 120° is a reference position.

In this embodiment, the self-learning process of the optimal driving direction is to adopt a Field Oriented Control (FOC) and/or other algorithms that can obtain the driving direction. In step S650, for any one of the reference positions, the controller 120 performs current excitation on the motor 20 through the drive circuit 10 to generate at least one feedback current (an array of feedback current values). The controller 120 calculates the rotor position using the maximum value of the array elements in the feedback current value array. The controller 120 then calculates the driving direction (i.e., the optimal driving direction) corresponding to the rotor position. In this embodiment, the FOC obtains the driving direction of the motor 20 at the current position to act as a reference value, and the optimal driving direction corresponding to the rotor position (one of the reference positions) is then calculated by the controller 120 with the least squares algorithm.

The paragraph above is to calculate the optimal driving direction for a certain reference position. By analogy with the above paragraphs, the controller 120 calculates the optimal driving directions of different reference positions, and stores the optimal driving directions corresponding to these reference positions in the memory 110 as control parameters. After the initialization period ends and the normal rotation period of the self-learning operation mode starts, the controller 120 obtains from the memory 110 the optimal driving directions corresponding to different reference positions (for example, in step S660). Therefore, after the motor 20 is activated (for example, in step S665), the controller 120 obtains the optimal driving direction corresponding to the current rotor position according to the current rotor position of the motor 20, and the controller 120 drives and controls the motor 20 in the optimal driving direction through the drive circuit 10 (for example, in step S670).

After the initialization period operation ends, the controller 120 stops the rotation of the motor 20 through the drive circuit 10 in step S655, and maintains the rotor position of the motor 20 at a known position with the locked exciting current determined in step S640 (the starting angle corresponding to the locked exciting current). After the initialization period ends, the controller 120 returns to step S630.

Generally, steps S635 to S650 only need to be carried out once. The control parameters of the memory 110 remain available until the system is powered off. When the power is removed, it is usually because the environment is changed (for example, the installation position or the load changes), so after the system is powered on again the controller 120 performs self-learning again (steps S635 to S655). When the control parameters in the memory 110 are ready, or when the rotor position is at the starting angle (and the decision of step S630 is "Yes"), the controller 120 ends the initialization period and enters the normal rotation period of the self-learning operation mode (steps S660 to S670). During a normal rotation period, the controller 120 continues to maintain the rotor position of the motor 20 at the starting angle through the drive circuit 10 with the locked exciting current until the controller 120 activates the motor 20 through the drive circuit 10 (step S665).

In step S660, the controller 120 loads from the memory 110 control parameters like starting-angle information, locked exciting current information, optimal phase, optimal driving direction, etc. In step S665, the controller 120 activates the motor 20 through the drive circuit 10 based on the automatic operation function or the user's operation instruction. Since the rotor position is a known position (that is, the starting angle), the controller 120 can accurately calculate the proper driving voltage, drive current, and driving direction using the control parameters obtained in step S660. Therefore, when the motor 20 is activated the next time, related problems such as motor vibration, fan vibration, noise, non-rotation of the rotor, and reverse rotation of the rotor may be resolved effectively.

In step S670, the controller 120 adopts the control parameters to control the strength and driving direction of the motor 20. For example, the controller 120 drives and controls the motor 20 with the optimum phase through the drive circuit 10, and drives and controls the motor 20 with the optimum driving direction corresponding to the current rotor position. Based on the automatic operation function or the user's operation instruction, the controller 120 stops the rotation of the motor 20 through the drive circuit 10 (step S675). After finishing each operation of the motor 20, the controller 120 maintains the motor rotor at the starting angle with the locked exciting current (step S675). At the next activation of the motor 20, since the rotor position is already a known angle (i.e., the starting angle), the controller 120 can accurately calculate the proper driving voltage, drive current, and driving direction. Therefore, the next time the motor 20 is activated, related problems such as motor vibration, fan vibration, noise, non-rotation of the rotor, and reverse rotation of the rotor may be resolved effectively.

In the conventional control technology, the controller needs to perform lots of algorithm operations during the normal rotation period of the motor because the feedback position signals need to be detected in real time. In order to read the position data in real time and to provide the most suitable driving direction, the operation of the algorithm takes up a lot of interruption time of the controller. Take the controller that adopts the FOC as an example. The analog-to-digital converter (ADC) needs to send an interrupt every 200 μs. If sinusoidal pulse width modulation (SPWM) or space vector modulation (SVM or SVPWM) control is also adopted, the modulation operation requires an interrupt every 60~30 μs. If the rotating speed of the motor increases, the interruption time becomes shorter, and important interrupts such as overcurrent protection and overvoltage protection may respond slowly, or the operation may even fail to complete within the interruption time, which makes the interrupts invalid.

Compared with the previous control technology, the embodiments of the disclosure performs self-learning during the initialization period before the normal rotation period starts, so as to calculate the control parameters suitable for the current environment in advance, and store the control parameters calculated in advance in the memory 110. As the data is stored in the memory 110 after the self-learning, most operations such as detection, calculation, and adjustment no longer occupy the interrupt processing time of the controller 120, thereby reducing greatly the workload of the controller 120. Because the workload of the controller 120 is reduced effectively, the controller 120 can easily provide immediate services for important interrupts such as overcurrent protection and overvoltage protection. In addition, this embodiment also increases the rotating speed to a higher level while maintaining high-efficiency performance under real-time control.

Although the disclosure has been disclosed by the embodiments above, they are not intended to limit the disclosure. Anyone with ordinary knowledge in the technical field can make changes and modifications without departing from the spirit and scope of the disclosure. The protection scope of the disclosure is determined by the scope of the claims attached.

What is claimed is:

1. A motor control device, comprising:
   a memory, adapted to store at least one control parameter, wherein the at least one control parameter comprises starting-angle information and locked exciting-current information; and
   a controller, coupled to the memory to access the at least one control parameter, wherein during an initialization period, the controller drives a motor to change a rotor position through a drive circuit for adjusting and obtaining a starting angle and a locked exciting current corresponding to the starting angle, the controller stores the starting-angle information corresponding to the starting angle and the locked exciting-current information corresponding to the locked exciting current in the memory, the starting angle and the locked exciting current corresponding to the starting angle are determined before a normal rotation period starts, and the normal rotation period is performed if the rotor position of the motor is at the starting angle before the normal rotation period starts; and
   after the initialization period ends, during the normal rotation period, the controller maintains the rotor position of the motor at the starting angle with the locked exciting current through the drive circuit until the controller activates the motor through the drive circuit.

2. The motor control device according to claim 1, wherein the motor is an N-phase motor, N is an integer, the controller performs a 2N-step drive on the motor through the drive circuit to adjust minimum exciting currents in respective steps of the 2N-step drive, the controller selects one of the minimum exciting currents of the 2N-step drive to act as the locked exciting current, and the controller adopts a composite vector angle corresponding to the locked exciting current as the starting angle.

3. The motor control device according to claim 2, wherein: an adjustment condition comprises that a displacement of the rotor position is greater than a displacement threshold or a drive current of the motor is less than or equal to a lower limit of current; in any step of the 2N-step drive, the controller reduces the drive current from a upper limit of current until the adjustment condition is satisfied; and the controller takes the drive current when the adjustment condition is satisfied as the minimum exciting currents of the any step of the 2N-step drive.

4. The motor control device according to claim 1, wherein during the initialization period, the controller drives the motor with a drive current through the drive circuit to maintain a speed of the motor at a target rotating speed, and the controller calculates an optimal phase of the drive current at the target rotating speed with an algorithm, and the controller stores the optimal phase corresponding to the target rotating speed in the memory.

5. The motor control device according to claim 4, wherein during the normal rotation period, when a rotating speed mode of the motor is set as the target rotating speed, the controller obtains from the memory the optimal phase corresponding to the target rotating speed, and the controller drives and controls the motor with the optimum phase through the drive circuit.

6. The motor control device according to claim 1, wherein a complete rotation of the motor comprises a plurality of reference positions, during the initialization period, for any one of the reference positions, the controller performs a current excitation on the motor through the drive circuit to generate at least one feedback current, the controller calculates the rotor position according to a maximum value of the at least one feedback current, the controller calculates a driving direction corresponding to the rotor position, and the controller stores the driving direction corresponding to the any one of the reference positions in the memory.

7. The motor control device according to claim 6, wherein during the normal rotation period, the controller obtains from the memory the driving direction corresponding to the rotor position according to the rotor position of the motor, and the controller drives and controls the motor in the driving direction through the drive circuit.

8. A motor control method, comprising:
driving a motor to change a rotor position for adjusting and obtaining a starting angle and a locked exciting current corresponding to the starting angle during an initialization period;
storing starting-angle information corresponding to the starting angle and locked exciting-current information corresponding to the locked exciting current in a memory during the initialization period, wherein the starting angle and the locked exciting current corresponding to the starting angle are determined before a normal rotation period starts, and the normal rotation period is performed if the rotor position of the motor is at the starting angle before the normal rotation period starts; and
maintaining the rotor position of the motor at the starting angle with the locked exciting current until the motor is activated during the normal rotation period after the initialization period ends.

9. The motor control method according to claim 8, wherein the motor comprises a brushless DC motor.

10. The motor control method according to claim 8, wherein the motor is an N-phase motor, N is an integer, and adjusting and obtaining the starting angle and the locked exciting current comprises:
performing a 2N-step drive on the motor to adjust and obtain minimum exciting currents in respective steps of the 2N-step drive;
selecting one of the minimum exciting currents of the 2N-step drive to act as the locked exciting current; and
adopting a composite vector angle corresponding to the locked exciting current as the starting angle.

* * * * *